June 22, 1965 — R. V. HELLER — 3,189,961
HOSE CLAMP
Filed Sept. 17, 1963

INVENTOR.
RICHARD V. HELLER
BY
Kane, Dalsimer and Kane
ATTORNEYS

United States Patent Office 3,189,961
Patented June 22, 1965

3,189,961
HOSE CLAMP
Richard V. Heller, Woodstock, N.Y., assignor to Rotron Manufacturing Company, Inc., Woodstock, N.Y., a corporation of New York
Filed Sept. 17, 1963, Ser. No. 309,450
1 Claim. (Cl. 24—20)

This invention relates generally to clamps and more particularly to a hose clamp.

There are numerous situations when it is necessary to connect a hose to another hose or to an inlet or outlet. Various ways are provided for accomplishing this among which is the utilization of a clamp.

The invention herein disclosed has as its principal object the furnishing of a new hose clamp of unitary structure which requires very little space, is simple to use, can be attached without the use of special tools and which is durable when in permanent installation.

Another object of this invention is to provide a hose clamp which can be readily applied and removed to a particular installation.

It is still another object of this invention to provide a unique hose clamp which can be produced at a reasonable price.

A hose clamp embodying the invention and the manner of using the same is described herein with references to the drawings, in which.

Figure 1:
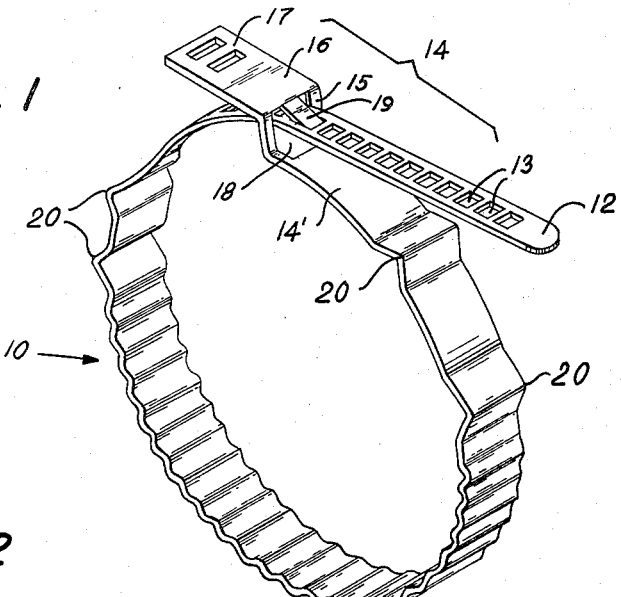
FIG. 1 is a perspective view of a hose clamp constructed in accordance with the teachings of this invention.
Figure 2:
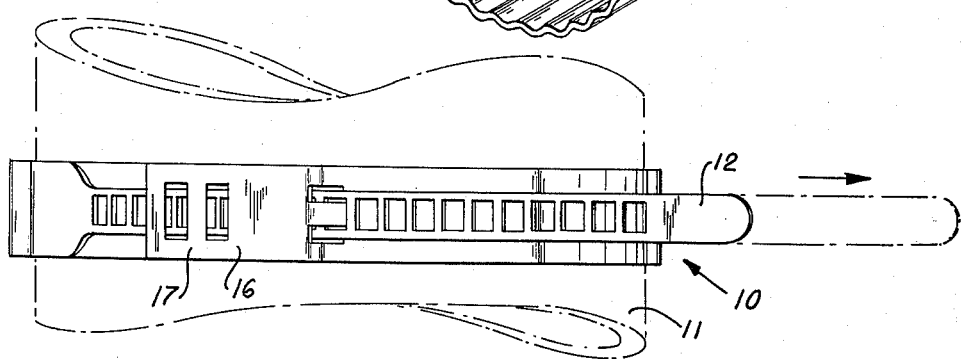
FIG. 2 is a plan view of the hose clamp illustrating the manner in which the ends are connected.

The hose clamp which is the subject of this invention is illustrated in the figures and indicated generally therein by the numeral 10. In FIG. 2 the hose clamp 10 is shown applied to a hose, a portion of which is illustrated in phantom and indicated by the numeral 11.

The clamp 10 is a unitary, elongated, rectangular member having a substantially rectangular cross-section formed of a resilient material, such as spring steel, polymer type elastomer, or metal reenforced elastomer, or any other suitable material with the capability of being deformed and returning to shape by itself.

End 12 of the hose clamp is made narrower than the remainder of the clamp and is provided with a plurality of perforations, holes or slots indicated by the numeral 13 which are displaced from one another along the longitudinal axis of narrow end 12. In the embodiment illustrated in the figures, the perforations 13 are displaced from one another at regular intervals. The remaining end 14 of the clamp is formed with an upwardly or outwardly directed portion 15, a flattened portion 16 and a perforated end 17. Outwardly directed bend portion 15 is formed with a substantially rectangular slot 18 which is continued into the flat portion 14' of the end and tongue 19 is punched out of end 14 and appears as a continuation of flat portion 16 but is projected downwardly toward flat portion 14' of the end 14. The tongue or tag 19 is substantially rectangular in cross-section having a restricted width so that the tongue can be projected within and through a slot 13. In like manner, narrow end 12 is restricted in width so that it will pass through opening 19.

Bends 20 are provided in the clamp between ends 12 and 14 to supply additional spring tension.

In use the clamp is turned upon itself to form a circle with narrow end 12 projecting through slot 18 and lying above flat portion 14' with tongue 19 projecting toward the center of the circle so formed and within one of the slots 13. The clamp is placed around a hose such as hose 11 and to tighten the clamp narrow end 12 and perforated upper portion 17 of the remaining end are pulled in opposite directions until the required tension is reached. Arrow A represents the pull on narrow portion 12 and arrow B represents the pull on the remaining end at grip 17. It is noted that as the tension is increased tongue 19 is directed slightly outwardly and portion 16 is directed slightly inwardly so that the tongue 19 can override the surface of narrow end 12 between the slots as forces A and B are applied. When the required tension is reached release of the ends allows the narrow end 12 to spring outward following its natural tendency to straighten out and the natural tendency of the elongated rectangular member from which the hose clamp has been formed to seek the substantially flat position which it had prior to the ends being turned upon themselves to form the circle. As end 12 tends to spring outward, tongue 19 engages one of the perforations 13 and becomes locked therein.

Figure 3:
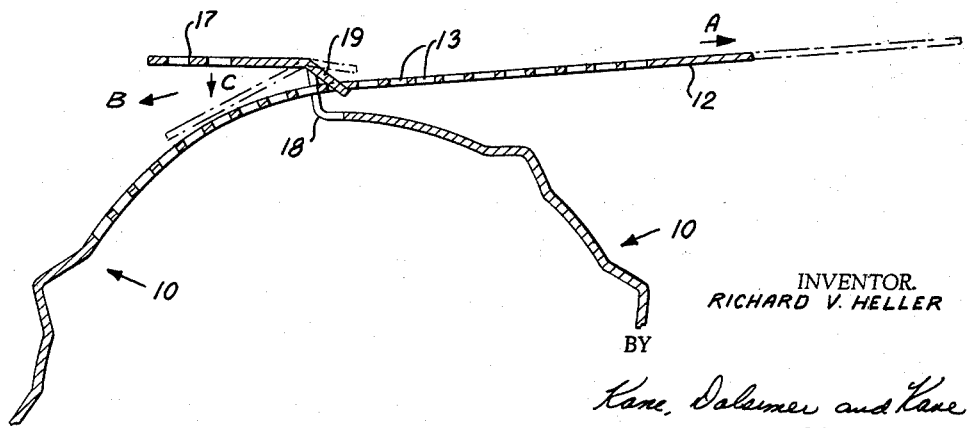
FIG. 3 is a segmentary sectional view of the connecting portion of the hose clamp.

To release the clamp, grip member 17 is pushed downwardly in the direction of arrow C in FIG. 3 and into the position shown in phantom, removing the end of tongue 19 from slot 13 within which it was disposed and due to the natural resiliency of the material, sometimes referred to as a memory, the tendency is for the narrow end 12 to attempt to release itself from the slot and the circle formed tends to widen or increase in diameter. The opening action can, of course, be aided by application of a suitable pull or push upon the ends to aid in separating them.

It is apparent, therefore, that a simple, unitary hose clamp has been provided which is inexpensive to manufacture, positive in action and which can be applied and removed with ease and without the necessity of special tools or skill.

Thus, among others, the several objects in the invention, as specifically aforenoted, are achieved. Obviously, numerous changes in construction and rearrangement of parts might be resorted to without departing from the spirit of the invention as defined by the claim.

I claim:

A hose clamp consisting of a substantially flat member formed from a resilient material, a first end of said member, a plurality of tongue receiving slots formed in said first end with each slot spaced from adjacent slots longitudinally of said member, a second end of said member, said ends turned upon one another to dispose said member in the form of a circle, a bent section of said member intermediate said first and second ends, a first portion of said bent section lying in the circumference of the circle so formed, a second portion of said bent section directed away from the center of the circle so formed, said second end forming an angle with said second portion, an end receiving slot formed in said first and second portions through which said first end is projected, a tongue formed in said bent section projecting toward the center of the circle so formed and within one of the slots of said plurality with said second end overlying said member and the resiliency of said member maintaining said tongue within said tongue receiving slot and said second end being resiliently pivotable about said bent section toward said member whereby said tongue is removed from said tongue receiving slot.

References Cited by the Examiner

UNITED STATES PATENTS

| | | | |
|---|---|---|---|
| Re. 14,762 | 11/19 | Springer | 24—22 |
| 1,173,998 | 2/16 | Depew | 24—23 |
| 1,176,189 | 3/16 | Thomas | 24—20 |

FOREIGN PATENTS 223,764   7/10   Germany.

DONLEY J. STOCKING, *Primary Examiner.*